(12) United States Patent
Gomi (10) Patent No.: US 12,038,417 B2
(45) Date of Patent: Jul. 16, 2024

(54) LIQUID SENDING SYSTEM FOR LIQUID CHROMATOGRAPH

(71) Applicant: SHIMADZU CORPORATION, Kyoto (JP)

(72) Inventor: Tomohiro Gomi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 277 days.

(21) Appl. No.: 17/438,076

(22) PCT Filed: Mar. 13, 2019

(86) PCT No.: PCT/JP2019/010318
§ 371 (c)(1),
(2) Date: Sep. 10, 2021

(87) PCT Pub. No.: WO2020/183654
PCT Pub. Date: Sep. 17, 2020

(65) Prior Publication Data
US 2022/0252555 A1    Aug. 11, 2022

(51) Int. Cl.
*G01N 30/32* (2006.01)
*G01N 30/02* (2006.01)

(52) U.S. Cl.
CPC ....... *G01N 30/32* (2013.01); *G01N 2030/027* (2013.01); *G01N 2030/326* (2013.01)

(58) Field of Classification Search
None
See application file for complete search history.

(56) References Cited

U.S. PATENT DOCUMENTS

| 4,448,692 A | 5/1984 | Nakamoto et al. |
| 2005/0147508 A1* | 7/2005 | Luongo ................. F04B 51/00 417/415 |

(Continued)

FOREIGN PATENT DOCUMENTS

| EP | 0106009 A1 | 4/1984 |
| JP | 60-011690 A | 1/1985 |

(Continued)

OTHER PUBLICATIONS

Notice of Reasons for Refusal for corresponding Japanese Patent Application No. 2021-504700 dated Jul. 26, 2022, with English language machine translation.

(Continued)

*Primary Examiner* — Patrick Assouad
*Assistant Examiner* — Mark A Shabman
(74) *Attorney, Agent, or Firm* — Renner, Otto, Boisselle & Sklar, LLP (57) ABSTRACT

A liquid sending system includes a plurality of liquid sending pumps that operate independently from one another and send a mobile phase into a common flow path, a pressure sensor for detecting a liquid sending pressure in the flow path, and a liquid sending failure detector configured to detect a liquid sending failure caused by any of the plurality of liquid sending pumps by periodically acquiring a liquid sending pressure detected by the pressure sensor and detecting a fluctuation of the liquid sending pressure associated with a driving period of each of the plurality of liquid sending pumps.

7 Claims, 7 Drawing Sheets

(56) References Cited

U.S. PATENT DOCUMENTS

| | | | | |
|---|---|---|---|---|
| 2008/0245136 | A1* | 10/2008 | Gerhardt | B01D 15/163 210/659 |
| 2013/0064683 | A1 | 3/2013 | Oshima et al. | |
| 2014/0299542 | A1 | 10/2014 | Song et al. | |
| 2014/0318224 | A1* | 10/2014 | Onoda | G01N 30/32 137/565.15 |
| 2016/0153942 | A1* | 6/2016 | Yotani | G01N 30/88 73/61.55 |
| 2019/0113488 | A1* | 4/2019 | Fogwill | G01N 30/8665 |
| 2019/0211813 | A1 | 7/2019 | Yanagibayashi et al. | |

FOREIGN PATENT DOCUMENTS

| | | |
|---|---|---|
| JP | 63-106382 A | 5/1988 |
| JP | 11-326300 A | 11/1999 |
| JP | 2000-130353 A | 5/2000 |
| JP | 2001-147222 A | 5/2001 |
| JP | 2004-524518 A | 8/2004 |
| WO | 02/053255 A1 | 7/2002 |
| WO | 2015/008845 A1 | 1/2015 |
| WO | 2018/055866 A1 | 3/2018 |

OTHER PUBLICATIONS

Office Action for related Chinese Patent Application No. 201980093712.3 dated Jul. 17, 2023, with English language machine translation.

International Search Report for corresponding Application No. PCT/JP2019/010318, mailed May 28, 2019.

Written Opinion for corresponding Application No. PCT/JP2019/010318, mailed May 28, 2019 (English machine translation).

Co-pending U.S. Appl. No. 17/438,418, filed Sep. 11, 2021.

Co-pending U.S. Appl. No. 17/438,419, filed Sep. 11, 2021.

Co-pending U.S. Appl. No. 17/438,421, filed Sep. 11, 2021.

Office Action in corresponding counterpart Chinese Patent Application No. 201980093792.2 dated Jun. 29, 2023, with English machine translation.

Office Action for co-pending U.S. Appl. No. 17/438,418 dated Aug. 17, 2023.

Office Action for co-pending U.S. Appl. No. 17/438,419 dated Nov. 6, 2023.

Notice of Reasons for Refusal for corresponding Japanese Patent Application No. 2021-505495 dated Jul. 5, 2022, with English language machine translation; previously submitted; legible copy submitted herewith.

Office Action in Chinese Patent Application No. 201980093792.2 dated Dec. 18, 2023, with English machine translation.

Notice of Allowance for co-pending U.S. Appl. No. 17/438,418 dated Jan. 8, 2024.

Office Action in co-pending U.S. Appl. No. 17/438,421 dated Apr. 10, 2024.

Notice of Reasons for Refusal for corresponding Japanese Patent Application No. 2021-504700 dated Jul. 5, 2022, with English language machine translation.

* cited by examiner

LIQUID SENDING SYSTEM FOR LIQUID CHROMATOGRAPH

TECHNICAL FIELD

The present invention relates to a liquid sending system for consecutively sending a mobile phase in a liquid chromatographic system.

BACKGROUND ART

It is required that a liquid sending system for a liquid chromatograph has an ability to stably send a solvent which is a mobile phase at a set flow rate. As a liquid sending pump to be used in a liquid sending system, a single plunger system including a single plunger pump and a double plunger system including two plunger pumps are employed.

When a plunger pump discharges a solvent, a periodically large fluctuation of liquid sending pressure that is so-called pulsation may occur when a liquid sending pressure decreases due to compression of solvent, leakage of liquid from a check valve, entrapment of fine bubbles in a flow path, shortage of solvent, etc. When pulsation occurs, the flow rate of a mobile phase is disrupted, and a result of analysis is negatively affected. This is a loss for a user. Therefore, measures have been taken to suppress pulsation by control of an operation of a plunger pump (see Patent Document 1), remove bubbles by use of a degassing unit or discharge bubbles in a flow path to outside by sending of a solvent at a high flow rate before an analysis is started, etc.

CITATION LIST

Patent Document

[Patent Document 1] JP 2001-147222 A

SUMMARY OF INVENTION

Technical Problem

Even with above-mentioned measures being taken, due to reasons such as a gas component that remained in a solvent becoming bubbles in a plunger pump or bubbles being generated when dissolved oxygen in a solvent was saturated due to a change in temperature, bubbles were entrapped in the plunger pump that was sending liquid, and an analysis continued. In such a case, the user continues to wastefully acquire analysis data.

Here, when a liquid sending failure caused by a liquid sending pump occurs, a liquid sending pressure becomes unstable. Thus, it is possible to detect whether a liquid sending failure has occurred by reading a fluctuation of liquid sending pressure. However, in a case where a mobile phase is sent with use of a plurality of liquid sending pumps such as sending of liquid in a high pressure gradient, for example, the magnitude of impact on a liquid sending pressure differs depending on an operation speed of each liquid sending pump. Thus, how a liquid sending pressure fluctuates differs depending on in which liquid sending pump a liquid sending failure has occurred. Therefore, it is considered that, in a case where a mobile phase is sent with the use of a plurality of liquid sending pumps, even when a liquid sending pressure is monitored with use of a single reference, a liquid sending failure cannot be detected accurately.

The present invention was conceived considering the above-mentioned problems, and an object of the present invention is to provide a liquid sending system including a function with which a liquid sending failure can be detected with high accuracy even in a case where a plurality of liquid sending pumps are operating.

Solution to Problem

A liquid sending system for a liquid chromatograph according to the present invention includes a plurality of liquid sending pumps that operate independently from one another and send a mobile phase into a common flow path, a pressure sensor for detecting a liquid sending pressure in the flow path, and a liquid sending failure detector configured to detect a liquid sending failure caused by the plurality of liquid sending pumps by periodically acquiring a liquid sending pressure detected by the pressure sensor and detecting a fluctuation in magnitude or frequency of the liquid sending pressure caused by an operation speed of any of the plurality of liquid sending pumps.

Advantageous Effects of Invention

A liquid sending system according to the present invention is configured to detect a liquid sending failure by detecting a fluctuation in magnitude or frequency of liquid sending pressure caused by an operation speed of any of a plurality of liquid sending pumps. Therefore, a liquid system including a function with which a liquid sending failure can be detected with high accuracy even in a case where a plurality of liquid sending pumps are operating is provided.

DESCRIPTION OF EMBODIMENTS

One inventive example of a liquid sending system for a liquid chromatograph according to the present invention will be described below with reference to the drawings.

Figure 1:
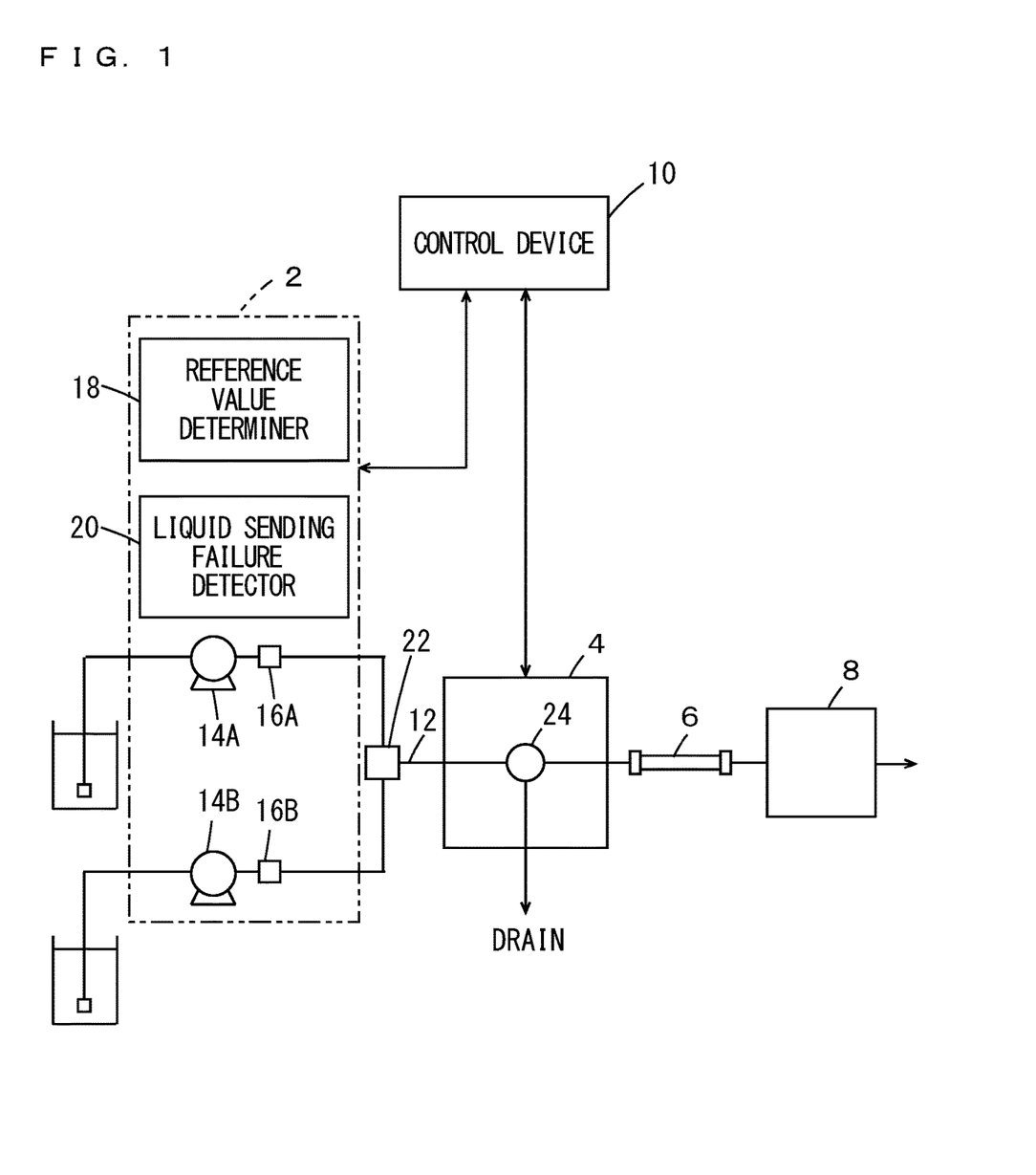
FIG. 1 A schematic diagram of the configuration of a liquid chromatograph showing one inventive example of a liquid sending system for a liquid chromatograph.

As shown in FIG. 1, a liquid chromatograph includes a liquid sending system 2, a sample injector 4, a separation column 6, a detector 8 and a control device 10.

The liquid sending system 2 of the inventive example includes two liquid sending pumps 14A, 14B that operate independently from each other and send a mobile phase into a common flow path 12. Pressure sensors 16A, 16B are respectively provided at positions farther rearward than the liquid sending pumps 14A, 14B, and liquid sending pressures of a mobile phase flowing through the flow path 12 are detected by the pressure sensors 16A, 16B. Here, although the two pressure sensors 16A, 16B are provided, only one of them may be provided. Solvents that are sent by the liquid sending pumps 14A, 14B are mixed in a mixer 22 and sent into the flow path 12 as a mobile phase.

While not being shown in the diagram, each of the liquid sending pumps 14A, 14B has two plunger pumps that are driven complementarily with each other and consecutively send liquid, for example. In such liquid sending pumps 14A, 14B, when bubbles are entrapped in pump chambers of the plunger pumps, a liquid sending failure which causes instability of liquid sending flow rate occurs.

In the liquid sending system 2, a reference value determiner 18 and a liquid sending failure detector 20 are provided as functions for detecting an occurrence of a liquid sending failure in the liquid sending pump 14A and/or the liquid sending pump 14B. The reference value determiner 18 and the liquid sending failure detector 20 are functions realized by execution of a predetermined program in an electronic circuit board or a computer that partially constitutes the liquid sending system 2. At least one of the reference value determiner 18 and the liquid sending failure detector 20 may be provided in the control device 10. In this case, the liquid sending system 2 includes the control device 10 with this concept. Details of the reference value determiner 18 and the liquid sending failure detector 20 will be described below.

The sample injector 4 is connected to a position farther downstream than the liquid sending pumps 14A, 14B of the liquid sending system 2. The sample injector 4 is to inject a sample into a mobile phase that is sent by each of the liquid sending pumps 14A, 14B of the liquid sending system 2. In the inventive example, the sample injector 4 includes a switch valve 24, and is configured to be capable of switching between a state in which a mobile phase from the liquid sending system 2 is guided to the separation column 6 and a state in which the mobile phase is discharged to a drain by switching the switch valve 24. The switch valve 24 of the sample injector 4 is not necessarily required to include a function of switching between a state in which a mobile phase from the liquid sending system 2 flows to the separation column 6 and a state in which a mobile phase is discharged to the drain. Separately from the sample injector 4, a switch valve having a function for switching between a state in which a mobile phase from the liquid sending system 2 is guided to the separation column 6 and a state in which a mobile phase is discharged to the drain may be provided or not provided.

The separation column 6 is connected to a position farther downstream than the sample injector 4, and the detector 8 is connected to a position farther downstream than the separation column 6. The separation column 6 is to separate a sample that has been injected into a mobile phase by the sample injector 4 into components, and sample components obtained by separation in the separation column 6 are detected by the detector 8.

The control device 10 is to manage at least the operations of the liquid sending system 2 and the sample injector 4, and is realized by a system controller dedicated to the liquid chromatograph and/or a general personal computer, for example. When the liquid sending failure detector 20 of the liquid sending system 2 detects a liquid sending failure of the liquid sending pump 14A and/or the liquid sending pump 14B, a signal indicating detection of a liquid sending failure is transmitted to the control device 10. In this case, when it is set in advance that a purge operation for resolving a liquid sending failure is to be performed, the control device 10 transmits an instruction for switching the switch valve 24 to the sample injector 4 such that a mobile phase is guided to the drain, and transmits an instruction for increasing a liquid sending flow rate to a predetermined high flow rate to the liquid sending system 2. Thus, bubbles entrapped in the liquid sending pump 14A and/or the liquid sending pump 14B are discharged to the drain.

Here, a fluctuation of liquid sending pressure in a case where bubbles are entrapped in a liquid sending pump will be described with reference to a pressure waveform of FIG. 7.

Figure 7:
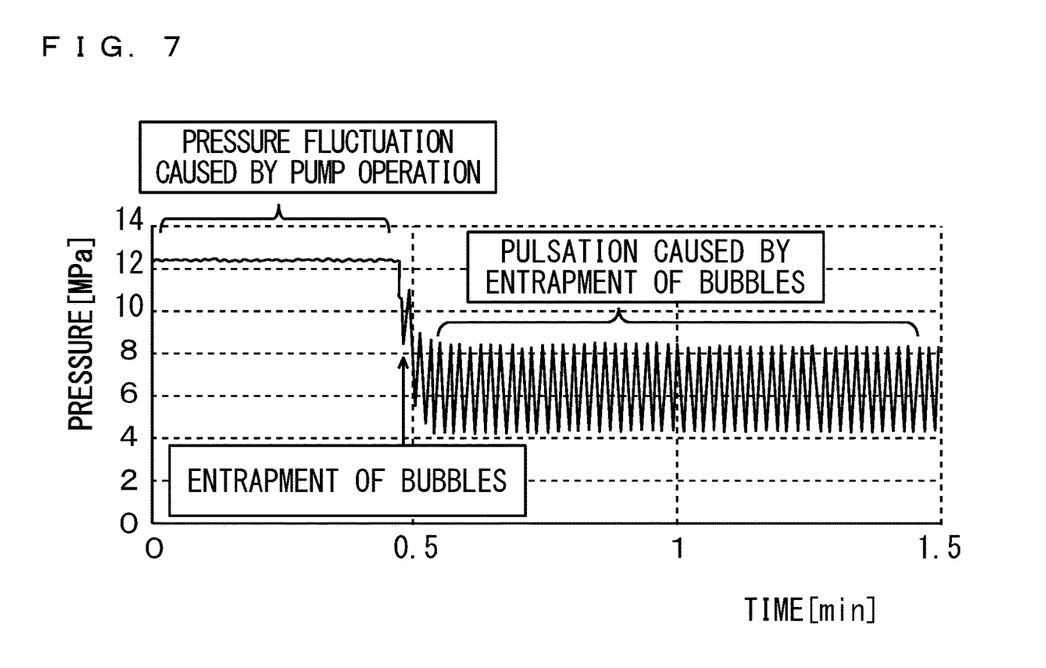
FIG. 7 One example of a waveform of a liquid sending pressure when bubbles are entrapped in a liquid sending pump.

As shown in the left part of the pressure waveform of FIG. 7, when a liquid sending pump is being able to stably send a mobile phase, although a subtle pressure fluctuation caused by an operation of the liquid sending pump, or the like can be seen, the liquid sending pressure is stable. In a case where bubbles are entrapped in one plunger pump of a liquid sending pump, when the plunger pump is performing a discharging operation, liquid is not discharged normally due to compression of bubbles, and a liquid sending pressure decreases rapidly. When the other plunger pump is performing a discharging operation, a liquid sending pressure increases since liquid is discharged normally. Therefore, as shown in the right part of the pressure waveform of FIG. 7, a periodical fluctuation (pulsation) of liquid sending pressure occurs. Therefore, the liquid sending failure detector 20 is configured to detect a liquid sending failure by detecting pulsation that is synchronized with a driving period of the liquid sending pump 14A and/or the liquid sending pump 14B.

As described above, a period of pulsation of liquid sending pressure caused by entrapment of bubbles in the liquid sending pump 14A and/or the liquid sending pump 14B is synchronized with a driving period of the liquid sending pump 14A and/or the liquid sending pump 14B in which bubbles are entrapped. Therefore, in order to detect pulsation, it is necessary to acquire a signal of the pressure sensor 16A and/or the pressure sensor 16B frequently enough to be able to read a fluctuation of liquid sending pressure in one driving period of the liquid sending pumps 14A, 14B. Therefore, the frequency of acquisition of a signal by a computer circuit that constitutes the liquid sending failure detector 20 from the pressure sensor 16A and/or the pressure sensor 16B may be adjusted in accordance with a driving speed of the liquid sending pump 14A and/or the liquid sending pump 14B. In this case, a period in which a signal is read from the pressure sensor 16A and/or the pressure sensor 16B can be determined by calculation when a liquid sending flow rate is determined.

In the inventive example, the liquid sending failure detector 20 is configured to detect pulsation by obtaining a fluctuation range of liquid sending pressure in a certain driving period of each of the liquid sending pumps 14A, 14B and comparing the fluctuation range with a reference value determined by the reference value determiner 18. Although the "fluctuation range of liquid sending pressure in a certain driving period of each of the liquid sending pumps 14A, 14B" may be a fluctuation range of liquid sending pressure in one driving period of each of the liquid sending pumps 14A, 14B, the "fluctuation range of liquid sending pressure in a certain driving period of each of the liquid sending pumps 14A, 14B" may be a fluctuation range of liquid sending pressure in a plurality of driving periods of each of the liquid sending pumps 14A, 14B or their average value.

The reference value determiner 18 is configured to determine a reference value for a fluctuation range to be used for detection of pulsation in regard to each of the liquid sending pumps 14A, 14B in consideration of a contribution ratio of each of the liquid sending pumps 14A, 14B with respect to a liquid sending flow rate of a mobile phase flowing through the flow path 12. In a case where bubbles are entrapped in a liquid sending pump having a larger liquid sending flow rate between the liquid sending pumps 14A, 14B, impact (a contribution ratio) which instability in sending liquid caused by the liquid sending pump has on a liquid sending pressure is large. Therefore, a fluctuation range of liquid sending pressure in one driving period of the liquid sending pump increases. On the other hand, in a case where bubbles are entrapped in a liquid sending pump having a smaller liquid sending flow rate between the liquid sending pumps 14A, 14B, impact (a contribution ratio) which instability in sending liquid caused by the liquid sending pump has on a liquid sending pressure is small. Therefore, a fluctuation range of liquid sending pressure in one driving period of the liquid sending pump decreases. Therefore, a reference value for detection of pulsation is required in regard to each of the liquid sending pumps 14A, 14B.

Here, a decrease range ΔP of liquid sending pressure caused by bubbles entrapped in the liquid sending pump 14A or 14B is determined by a time constant r of the liquid chromatograph. A time constant r is a value that depends on an entire liquid sending pressure P[MPa], a damper C[uL/MPa] and a liquid sending flow rate Q[mL/min]. A damper C[uL/MPa] is a value that depends on an internal volume V[uL] of each module or a pipe that constitutes the liquid chromatograph and a compression rate $\beta[\text{GPa}^{-1}]$ of a mobile phase. For example, in a case where a period of time that has elapsed since bubbles are entrapped in the liquid sending pump 14A or 14B is t seconds, it is considered that the decrease range ΔP of liquid sending pressure is determined by the following formula.

$$\Delta P \propto e^{-\frac{t}{\tau}} f(P, C, Q, t)$$

Therefore, a reference value for determination in regard to whether pulsation is caused by entrapment of bubbles in the liquid sending pump 14A or 14B can be determined in consideration of ΔP obtained by the above-mentioned formula. However, some of arguments P, C, Q, t (or P, V, β, Q, t) of the above-mentioned formula may be not used, and a reference value may be determined more simply. For example, ΔP that is obtained when only P, C are taken as arguments and other elements are taken as fixed values may be used as a reference.

For example, in a case where the ratio between a liquid sending flow rate of the liquid sending pump 14A and a liquid sending flow rate of the liquid sending pump 14B is 9:1, the contribution ratios of the liquid sending pumps 14A, 14B can be 0.9, 0.1, respectively. A value obtained from ΔP calculated with use of the above-mentioned formula is multiplied by each of the contribution ratio 0.9, 0.1, whereby a reference value can be determined in regard to each of the liquid sending pumps 14A, 14B.

One example of algorithm of detection of pulsation will be described with reference to the flowchart of FIG. 2.

Figure 2:
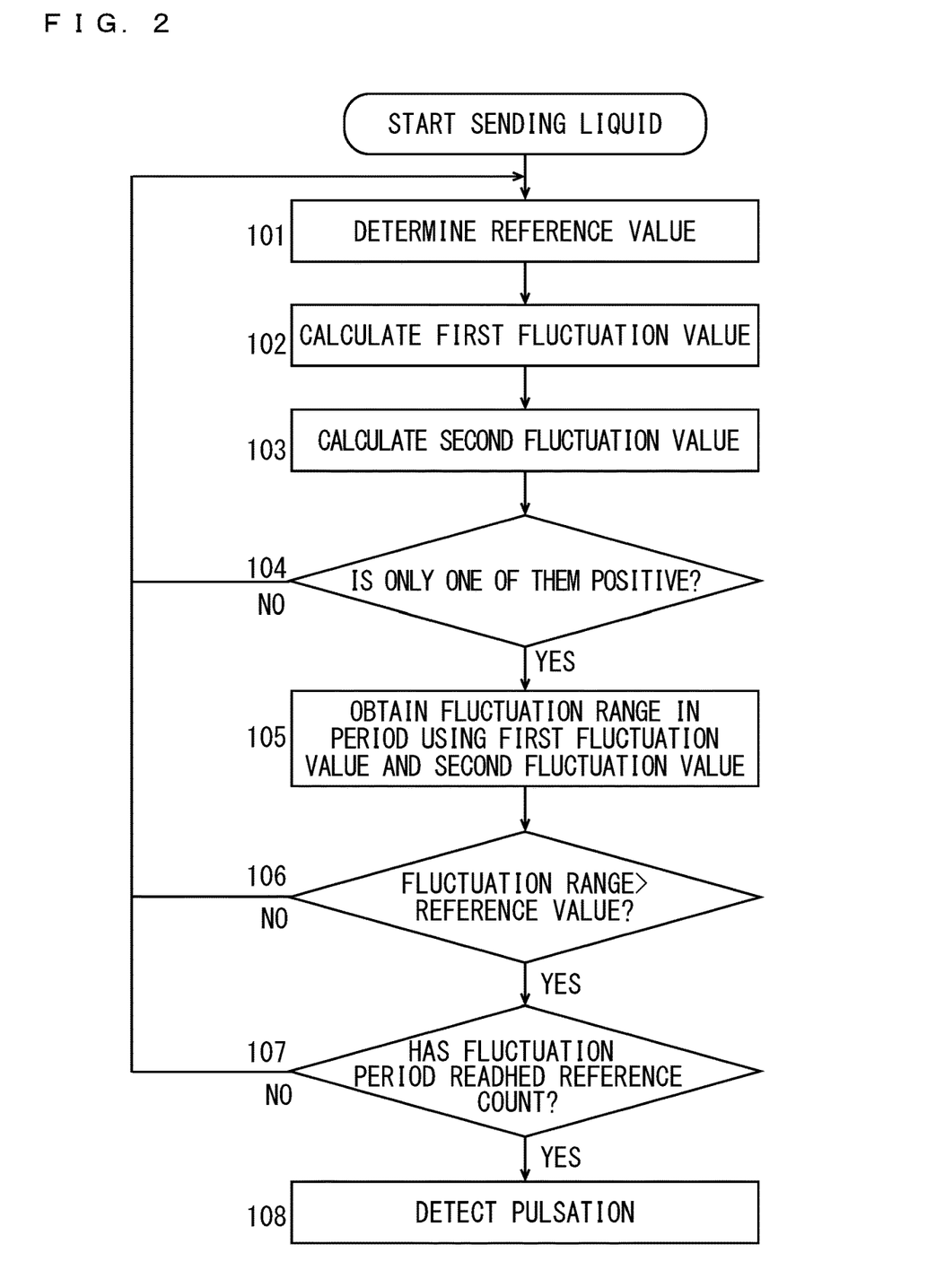
FIG. 2 A flowchart for explaining the algorithm of detection of pulsation in the same inventive example.

The example of FIG. 2 is advantageous in a case where a fluctuation of liquid sending pressure in one driving period of each of the liquid sending pumps 14A, 14B can be read in several tens of segments. In this case, liquid sending pressures at a start point and an end point of a discharging operation of each plunger pump of each of the liquid sending pumps 14A and 14B can be read accurately. Here, one driving period of each of the liquid sending pumps 14A, 14B refers to a period from a point in time at which one plunger pump of the plunger pumps that constitute each of the liquid sending pump 14A and 14B starts a discharging operation to a point in time at which the other plunger pump ends a discharging operation.

A computer circuit that constitutes the reference value determiner 18 and the liquid sending failure detector 20 acquires signals of the pressure sensor 16A and/or pressure sensor 16B at a predetermined frequency and reads a liquid sending pressure (moving average value). The reference value determiner 18 and the liquid sending failure detector 20 execute the below-mentioned steps 101 to 108 in regard to each of the liquid sending pumps 14A, 14B. Here, only the liquid sending pump 14A will be described, by way of example.

The reference value determiner 18 determines a reference value in regard to the liquid sending pump 14A using a read liquid sending pressure and a contribution ratio of the liquid sending pump 14A with respect to a liquid sending flow rate (step 101). Thereafter, when reading liquid sending pressures at a start point and an end point of a discharging operation of one plunger pump of the plunger pumps that constitute the liquid sending pump 14A, the liquid sending failure detector 20 obtains the difference (the liquid sending pressure at the start point minus the liquid sending pressure at the end point) as a first fluctuation value (step 102). When reading liquid sending pressures at a start point and an end point of a discharging operation of the other plunger pump, the liquid sending failure detector 20 obtains the difference (the liquid sending pressure at the start point minus the liquid sending pressure at the end point) as a second fluctuation value (step 103). In a case where bubbles are entrapped in one of the plunger pumps that constitute the liquid sending pump 14A, a liquid sending pressure decreases when one plunger pump in which bubbles are entrapped is performing a discharging operation, and a liquid sending pressure increases when the other plunger pump in which bubbles are not entrapped is performing a discharging operation. Therefore, in a case where a liquid sending failure caused by entrapment of bubbles has occurred in the liquid sending pump 14A, only one of the first fluctuation value and the second fluctuation value is a positive value (the other value is a negative value). Therefore, in a case where the signs of a first fluctuation value and a second fluctuation value are the same, the liquid sending failure detector 20 determines that pulsation is not caused by entrapment of bubbles (step 104).

In a case where only one of a first fluctuation value and a second fluctuation value is a positive value, the liquid sending failure detector 20 obtains a fluctuation range of liquid sending pressure in one driving period of the liquid sending pump 14A using the first fluctuation value and the second fluctuation value (step 105). A fluctuation range of liquid sending pressure can be obtained by a following formula, for example.

A fluctuation range=|a first fluctuation value−a second fluctuation value|/2

The above-mentioned formula is one example, and a fluctuation range may be obtained using a formula such as A fluctuation range=|a first fluctuation value−a second fluctuation value| or $$\text{A fluctuation range} = (\text{a first fluctuation value} - \text{a second fluctuation value})^2.$$

The liquid sending failure detector 20 compares the above-mentioned fluctuation range with a reference value determined by the reference value determiner 18 (step 106). In a case where the fluctuation range exceeds the reference value, the liquid sending failure detector 20 counts the number of consecutive driving periods (fluctuation periods) in which the fluctuation range exceeds the reference value (step 107). Then, when the number of consecutive fluctuation periods reaches a predetermined reference count, pulsation is detected (steps 108).

Here, a reference count which is used as a reference in regard to the number of consecutive pressure fluctuations to be used for determination of pulsation may be adjusted variably. If so, the reference count can be adjusted in accordance with the degree of sensitivity of detection of pulsation.

An algorithm of detection of pulsation is not limited to the above-mentioned algorithm. For example, it is possible to use an algorithm of detection of pulsation by monitoring a liquid sending pressure in each driving period of each of the liquid sending pumps 14A, 14B, obtaining a fluctuation range of liquid sending pressure in one driving period and comparing the fluctuation range with a reference value determined as described above.

Figure 3:
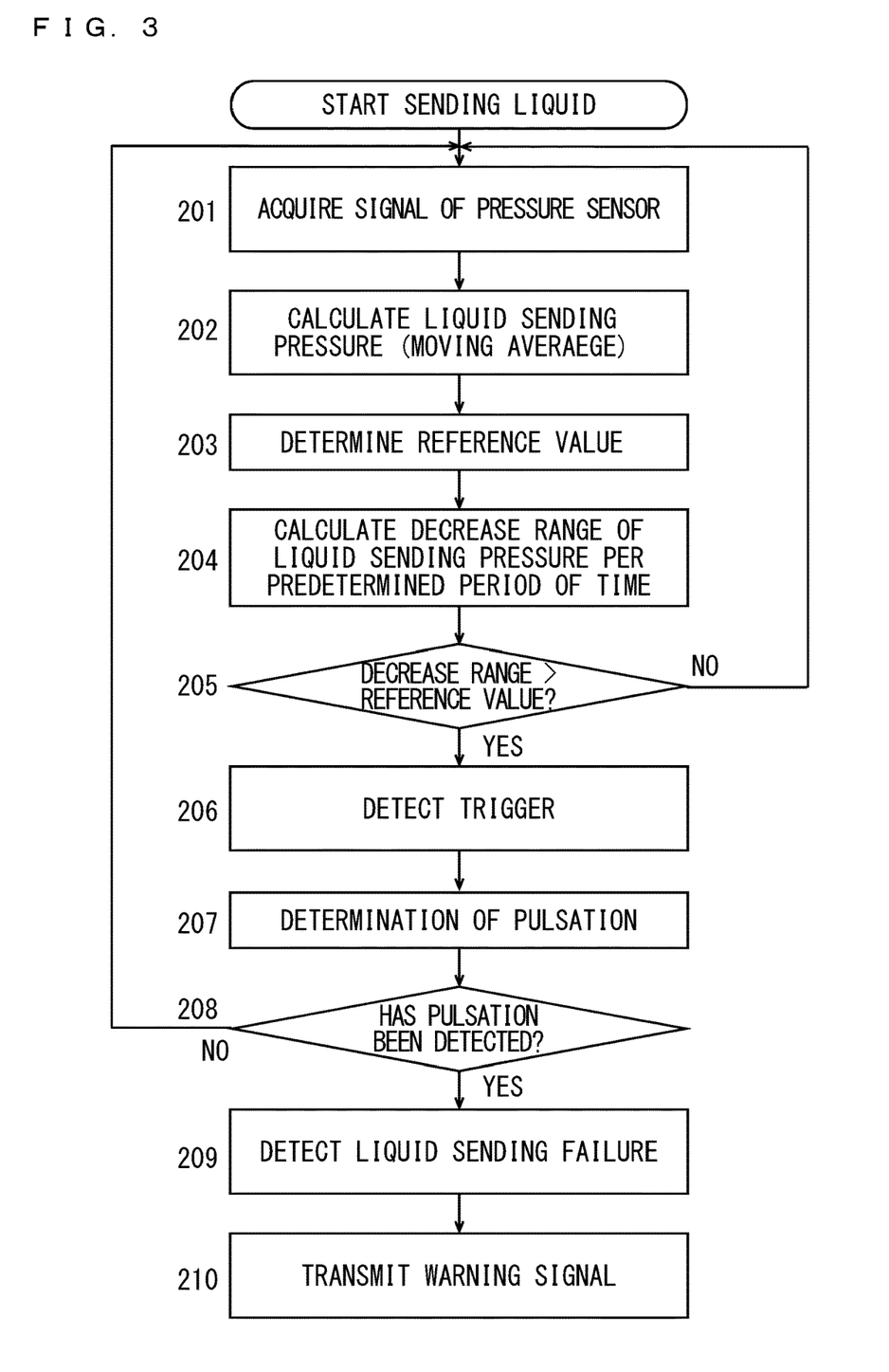
FIG. 3 A flowchart for explaining the algorithm of detection of a trigger in the same inventive example.

The above-mentioned algorithm of obtaining a fluctuation range of liquid sending pressure in one driving period and comparing the fluctuation range with a reference value is effective in a case where liquid sending pressures at a start point and an end point of a discharging operation of each plunger pump that constitutes the liquid sending pumps 14A, 14B cannot be read accurately. However, the algorithm cannot judge whether a liquid sending pressure has decreased or increased in one driving period of each of the liquid sending pumps 14A, 14B, thereby not being able to certainly determine whether a pressure fluctuation is caused by entrapment of bubbles. As such, before the algorithm for detection of pulsation is executed, an algorithm for detection of a trigger as shown in the flowchart of FIG. 3 may be introduced.

One example of the algorithm of detection of a trigger will be described below with reference to FIG. 3. Also here, only the liquid sending pump 14A will be described, by way of example.

A computer circuit that constitutes the reference value determiner 18 and the liquid sending failure detector 20 reads a signal of the pressure sensor 16A and/or the pressure sensor 16B in a predetermined period (step 201) and calculates a liquid sending pressure (moving average value) (step 202). The reference value determiner 18 determines a reference value for detection of a trigger using a read liquid sending pressure and a contribution ratio of the liquid sending pump 14A (step 203). A reference value for detection of a trigger may be the same as or different from a reference value for detection of pulsation. The liquid sending failure detector 20 calculates a decrease range of liquid sending pressure per period of time (a period of time in which a signal is read ten times, for example) that is set based on a driving period of the liquid sending pump 14A (step 204). Then, the calculated decrease range is compared with a reference value determined by the reference value determiner 18 (step 205). When the decrease range exceeds the reference value, a trigger for an occurrence of pulsation is detected (step 206).

After detecting a trigger, the liquid sending failure detector 20 detects pulsation using the above-mentioned algorithm of detection of pulsation (step 207). In a case where pulsation is detected, the liquid sending failure detector 20 detects a liquid sending failure (steps 208, 209) and transmits a warning signal to the control device 10 (step 210). In a case where pulsation is not detected, the process returns to the above-mentioned step 201 (step 208).

Coefficients to be used for determination of a period in which a signal is read from each of the pressure sensors 16A, 16B, a reference value for detection of a trigger and a reference value for detection of pulsation by calculation may be adjusted variably by a user's input of a change instruction or based on user's evaluation in regard to a result of actual detection of a liquid sending failure. Further, in a case where the analysis system of the liquid chromatograph is connected to a common database shared with an analysis system of another liquid chromatograph through a network line such as an internet line, each coefficient, described above, may be automatically adjusted based on user's evaluation accumulated in the database in regard to a result of detection of liquid sending failure.

Figure 4:
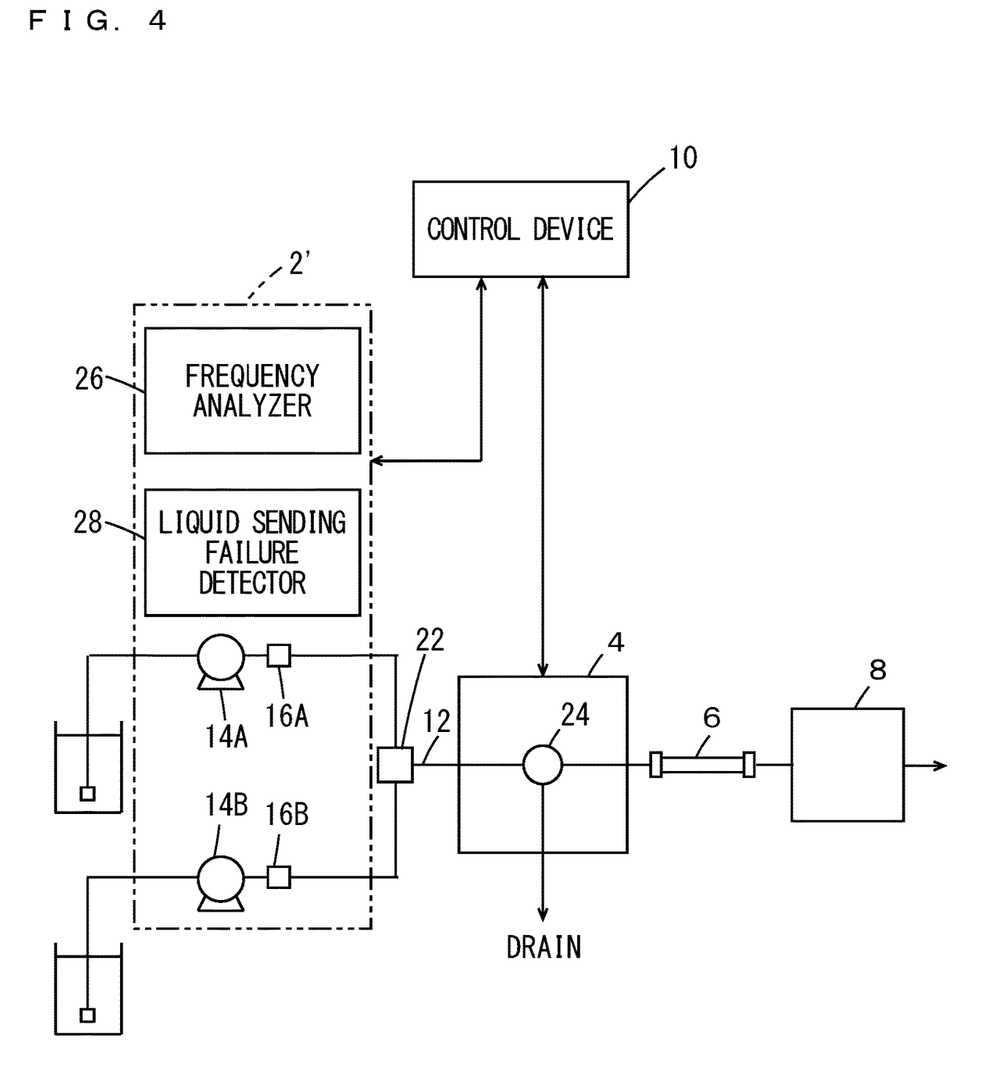
FIG. 4 A schematic diagram of the configuration of a liquid chromatograph showing another inventive example of a liquid sending system for a liquid chromatograph.

FIG. 4 is a diagram showing the schematic configuration of another inventive example of a liquid sending system for a liquid chromatograph.

The liquid sending system 2' of the inventive example has a function of detecting presence or absence of a liquid sending failure caused by entrapment of bubbles in a liquid sending pump 14A and/or a liquid sending pump 14B by performing a frequency analysis of a fluctuation of liquid sending pressure. As described above, pulsation caused by entrapment of bubbles in the liquid sending pump 14A or 14B is synchronized with a driving period of the liquid sending pump 14A and/or the liquid sending pump 14B in which bubbles are entrapped. Therefore, in a case where bubbles are entrapped in the liquid sending pump 14A and/or the liquid sending pump 14B, a fluctuation frequency of liquid sending pressure coincides with a driving frequency of the liquid sending pump 14A and/or the liquid sending pump 14B. As such, the liquid sending system 2' of the inventive example includes a frequency analyzer 26 and a liquid sending failure detector 28. The frequency analyzer 26 and the liquid sending failure detector 28 are functions realized by execution of a predetermined program in an electronic circuit board or a computer that partially constitutes the liquid sending system 2'.

The frequency analyzer 26 is configured to perform a frequency analysis of liquid sending pressure detected by the pressure sensor 16A and/or the pressure sensor 16B.

As a result of a frequency analysis performed by the frequency analyzer 26, in a case where a liquid sending pressure fluctuates at a specific frequency, the liquid sending failure detector 28 is configured to detect a liquid sending failure caused by entrapment of bubbles in the liquid sending pump 14A and/or the liquid sending pump 14B. In another preferred embodiment, in a case where a liquid sending failure is detected, the liquid sending failure detector 28 is configured to specify a fluctuation frequency of liquid sending pressure and obtain a driving frequency of each of the liquid sending pumps 14A, 14B, and specify a liquid sending pump that operates at a frequency that coincides with a fluctuation frequency. A driving frequency of the liquid sending pump 14A and/or the liquid sending pump 14B in which bubbles are entrapped coincides with a fluctuation frequency.

Figure 5:
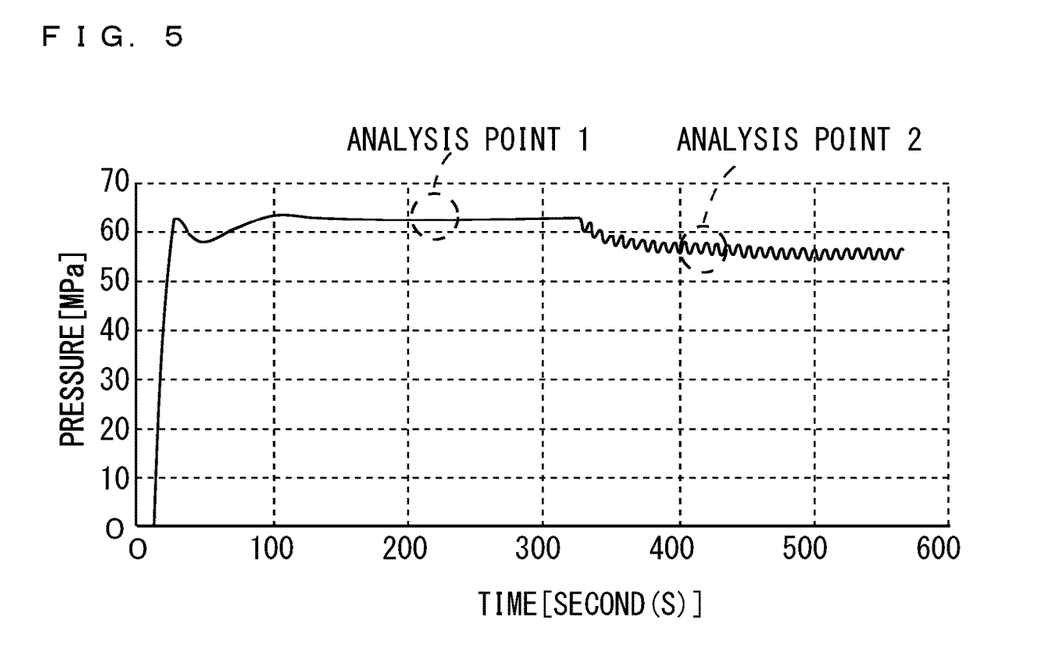
FIG. 5 One example of a pressure waveform in a case where bubbles are entrapped in one liquid sending pump.

FIG. 5 shows a waveform of liquid sending pressure in a case where the liquid sending pumps 14A, 14B operate at a flow ratio of 9:1 (a contribution ratio=9:1) and bubbles are entrapped midway in the liquid sending pump 14B. Further, FIG. 6A is result data of a frequency analysis at an analysis point 1 of the pressure waveform of FIG. 5, and FIG. 6B is result data of a frequency analysis at an analysis point 2 of the pressure waveform of FIG. 5.

Figure 6A:
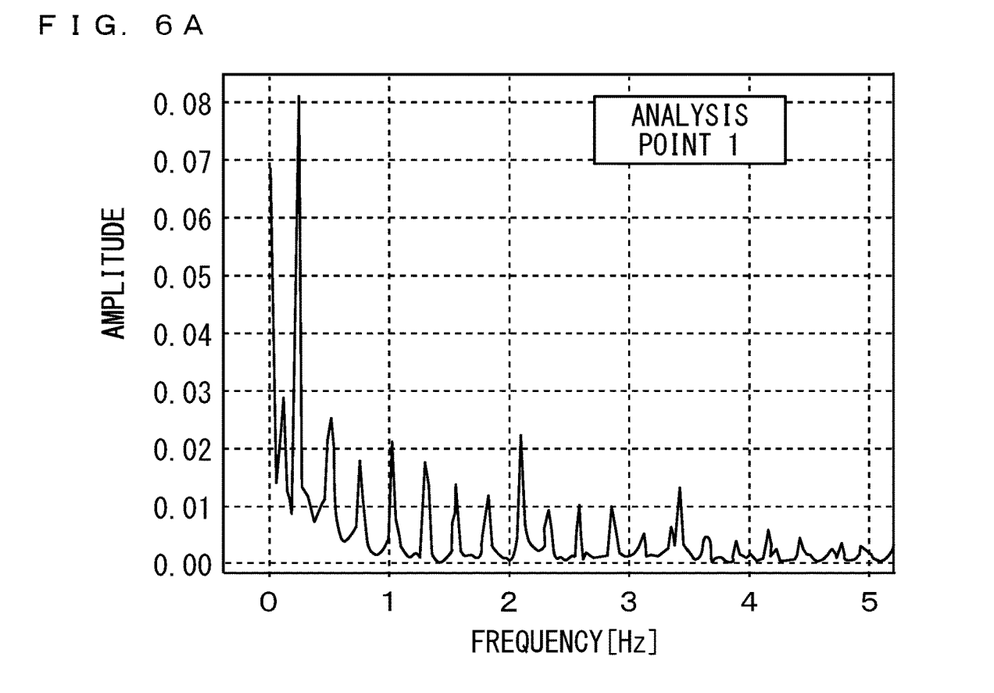
FIG. 6A Data showing a result of a frequency analysis at an analysis point 1 of FIG. 4.
Figure 6B:
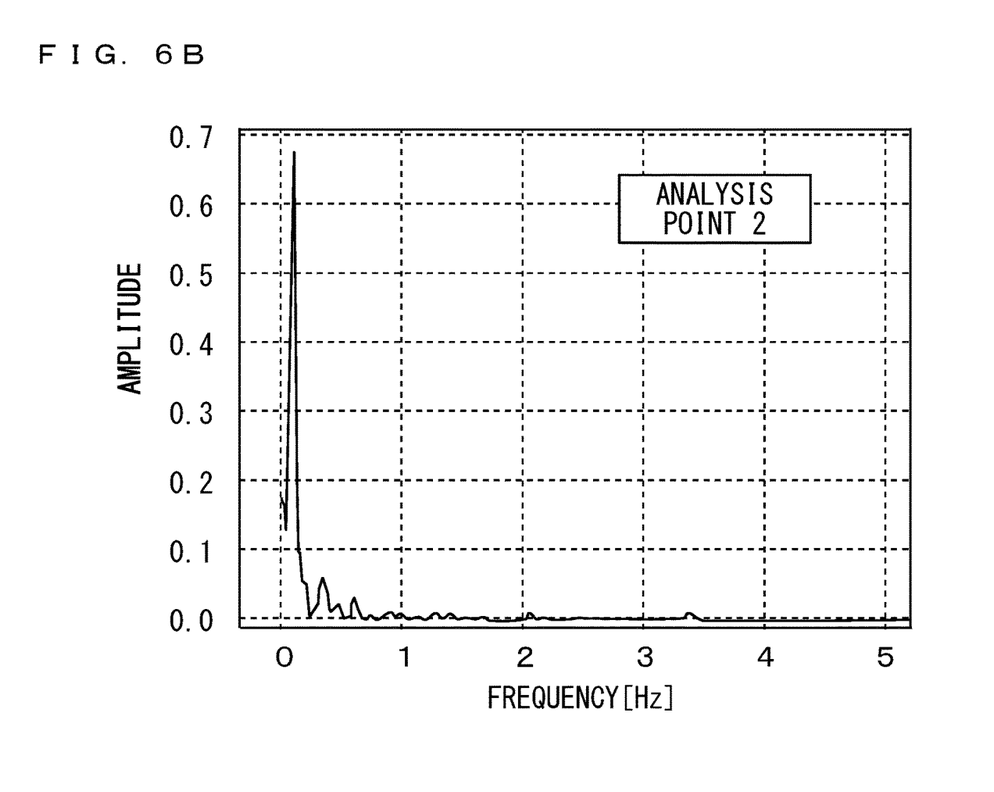
FIG. 6B Data showing a result of a frequency analysis at an analysis point 2 of FIG. 4.

As shown in FIG. 6A, at a point in time at which bubbles are not entrapped in any of the liquid sending pumps 14A, 14B, there is a lot of noise derived from operations of the liquid sending pumps 14A, 14B or the like, and a large peak is not seen at a specific frequency. On the other hand, as shown in FIG. 6B, it is found that, after bubbles are entrapped in the liquid sending pump 14B, only the value of a peak derived from a driving frequency of the liquid sending pump 14B is significantly high.

With the above-mentioned validation, it is found that presence or absence of a liquid sending failure caused by entrapment of bubbles in a specific liquid sending pump can be detected by a frequency analysis of liquid sending pressure.

While the liquid sending systems 2, 2' including two liquid sending pumps 14A, 14B are described in the above-mentioned inventive example by way of example, the present invention is not limited to this. The present invention can be similarly applied to a liquid sending system having three or more liquid sending pumps. That is, the above-mentioned inventive example is merely one example of embodiments of the liquid sending system according to the present invention. The embodiments of the liquid sending system according to the present invention are as described below.

In an embodiment of a liquid sending system according to the present invention, the liquid sending system includes a plurality of liquid sending pumps that operate independently from one another and send a mobile phase into a common flow path, a pressure sensor for detecting a liquid sending pressure in the flow path, and a liquid sending failure detector configured to detect a liquid sending failure caused by the plurality of liquid sending pumps by periodically acquiring a liquid sending pressure detected by the pressure sensor and detecting a fluctuation of the liquid sending pressure associated with a driving period of each of the plurality of liquid sending pumps.

A first aspect of the embodiment of the liquid sending system according to the present invention, the liquid sending system includes a reference value determiner configured to obtain a contribution ratio of each of the plurality of liquid sending pumps with respect to a liquid sending flow rate of a mobile phase in the flow path, and determine a reference value for a fluctuation range of a liquid sending pressure in the flow path in a case where a liquid sending failure occurs in regard to each of the plurality of liquid sending pumps using the contribution ratio, wherein the liquid sending failure detector is configured to obtain a fluctuation range of the liquid sending pressure in a certain driving period of the liquid sending pump, and detect a liquid sending failure using the obtained fluctuation range and each reference value determined by the reference value determiner, in regard to each of the plurality of liquid sending pumps. With such an aspect, pulsation can be detected with high accuracy with use of a reference value in consideration of a contribution ratio of each of the liquid sending pumps.

As a specific example of the above-mentioned first aspect, the liquid sending failure detector may be configured to execute a pulsation detection step of detecting pulsation on a condition that a count of consecutive periods in which the fluctuation range exceeds a reference value determined by the reference value determiner exceeds a predetermined reference count, and a liquid sending failure detection step of detecting a liquid sending failure of the liquid sending pump when the pulsation is detected in the pulsation detection step, in this order.

As another specific example of aspect of the above-mentioned specific example, the liquid sending pump is a double plunger pump including two plunger pumps that are driven complementarily, and the liquid sending failure detector, in the pulsation detection step, is configured to obtain a difference between the liquid sending pressures at a start point and an end point of a discharging operation of one of the two plunger pumps as a first fluctuation value, obtain a difference between the liquid sending failures at a start point and an end point of a discharging operation of another one of the two plunger pumps as a second fluctuation value, and obtain the fluctuation range using the first fluctuation value and the second fluctuation value. With such a specific aspect example, pulsation can be detected in consideration of a fluctuation of liquid sending pressure during a discharging operation of one plunger pump of the liquid sending pump and a fluctuation of liquid sending pressure during a discharging operation of the other plunger pump. Therefore, pulsation caused by entrapment of bubbles can be detected more accurately.

In the above-mentioned specific aspect example, the liquid sending failure detector, in the pulsation detection step, can be configured to count only a period in which only one of the first fluctuation value and the second fluctuation value is a positive value as a period in which the fluctuation range exceeds a reference value determined by the reference value determiner. In a case where bubbles are entrapped in one plunger pump of the double plunger pump, a liquid sending pressure decreases during a discharging operation of one plunger pump, and a liquid sending pressure increases during a discharging operation of the other plunger pump. Thus, the first fluctuation value and the second fluctuation value have different signs. Therefore, it is possible to detect pulsation more accurately by counting only a period in which only one of the first variation value and the second variation value is a positive value as one period.

In a second aspect of the embodiment of the liquid sending system according to the present invention, the liquid sending failure detector, before the pulsation detection step, in regard to each of the plurality of liquid sending pumps, is configured to execute a pressure decrease calculation step of calculating a decrease range of a liquid sending pressure per period of time that is set based on the driving period of the liquid sending pump, and a trigger detection step of detecting a trigger for an occurrence of pulsation when a decrease range calculated in the pressure decrease calculation step exceeds a reference value determined by the reference value determiner, and is configured to execute a pulsation determination step after the trigger is detected in the trigger detection step. With such an aspect, even in a case where a detailed fluctuation of liquid sending pressure in one driving period of the liquid sending pump cannot be read, a rapid decrease of liquid sending pressure can be detected. Although a liquid sending pressure can change in one driving period of the liquid sending pump due to a change in composition of a mobile phase, a rapid decrease in liquid sending pressure caused by entrapment of bubbles in the liquid sending pump does not occur even in such a case. Thus, it is possible to prevent a change in liquid sending pressure caused by a change in composition of a mobile phase or the like from being erroneously detected as pulsation caused by entrapment of bubbles by introducing the above-mentioned trigger detection step.

In a third aspect of the embodiment of the liquid sending system according to the present invention, the liquid sending system includes a frequency analyzer configured to perform a frequency analysis of a fluctuation of a liquid sending pressure detected by the pressure sensor, and the liquid sending failure detector is configured to detect a liquid sending failure in the liquid sending pump when a fluctuation of liquid sending pressure has occurred at a specific frequency in an analysis result obtained by the frequency analysis.

In the above-mentioned third aspect, the liquid sending failure detector may be configured to specify the liquid sending pump in which a liquid sending failure has occurred by specifying a fluctuation frequency of the liquid sending pressure in an analysis result obtained by the frequency analysis, obtaining a driving frequency of each of the plurality of liquid sending pumps and comparing the specified fluctuation frequency with the driving frequency of each of the plurality of liquid sending pumps. This enables easy specification of a liquid sending pump in which bubbles are entrapped and makes it easy to deal with the process afterward.

REFERENCE SIGNS LIST 2, 2' Liquid sending systems
4 Sample injector
6 Separation column
8 Detector
10 Control device
12 Flow path
14A, 14B Liquid sending pumps
16A, 16B Pressure sensors
18 Reference value determiner
20, 28 Liquid sending failure detectors
22 Mixer
24 Switch valve
26 Frequency analyzer

The invention claimed is:

1. A liquid sending system for a liquid chromatograph, comprising:
   a plurality of liquid sending pumps that send a mobile phase into a common flow path;
   a plurality of pressure sensors each of which is placed between each liquid sending pump and the common flow path in order to detect a liquid sending pressure in each liquid sending pump;
   a liquid sending failure detector configured to detect a liquid sending failure caused by the plurality of liquid sending pumps by periodically acquiring a liquid sending pressure detected by each of the plurality of pressure sensors and detecting a fluctuation in magnitude or frequency of the liquid sending pressure caused by an operation speed of any of the plurality of liquid sending pumps: and
   a reference value determiner configured to obtain a contribution ratio of each of the plurality of liquid sending pumps with respect to a liquid sending flow rate of a mobile phase in the common flow path, and determine a reference value using the contribution ratio for a fluctuation range of the liquid sending pressure in a case where a liquid sending failure occurs in regard to each of the plurality of liquid sending pumps,
   wherein the liquid sending failure detector is configured to obtain a fluctuation range of the liquid sending pressure in a driving period of the liquid sending pump, and detect a liquid sending failure using the obtained fluctuation range and each reference value determined by the reference value determiner, in regard to each of the plurality of liquid sending pumps.

2. The liquid sending system for a liquid chromatograph according to claim 1, wherein
   the liquid sending failure detector is configured to execute:
   a pulsation detection step of detecting that a count of consecutive periods in which the fluctuation range exceeds a reference value determined by the reference value determiner exceeds a predetermined reference count; and
   a liquid sending failure detection step of detecting a liquid sending failure of the liquid sending pump when it is detected that the count of consecutive periods exceeds the predetermined reference count in the pulsation detection step, in this order.

3. The liquid sending system for a liquid chromatograph according to claim 2, wherein
   the liquid sending pump is a double plunger pump including two plunger pumps that are driven complementarily, and
   the liquid sending failure detector, in the pulsation detection step, is configured to obtain a difference between the liquid sending pressures at a start point and an end point of a discharging operation of one of the two plunger pumps as a first fluctuation value, obtain a difference between the liquid sending failures at a start point and an end point of a discharging operation of another one of the two plunger pumps as a second fluctuation value, and obtain the fluctuation range using the first fluctuation value and the second fluctuation value.

4. The liquid sending system for a liquid chromatograph according to claim 3, wherein
   the liquid sending failure detector, in the pulsation detection step, is configured to count only a period in which only one of the first fluctuation value and the second fluctuation value is a positive value as a period in which the fluctuation range exceeds a reference value determined by the reference value determiner.

5. The liquid sending system for a liquid chromatograph according to claim 2, wherein
   the liquid sending failure detector, before the pulsation detection step, in regard to each of the plurality of liquid sending pumps,
   is configured to execute:
   a pressure decrease calculation step of calculating a decrease range of a liquid sending pressure per period of time that is set based on the driving period of the liquid sending pump; and
   a trigger detection step of detecting a trigger for an occurrence of pulsation when a decrease range calculated in the pressure decrease calculation step exceeds a reference value determined by the reference value determiner, and
   is configured to execute a pulsation determination step after the trigger is detected in the trigger detection step.

6. The liquid sending system for a liquid chromatograph according to claim 1, comprising a frequency analyzer configured to perform a frequency analysis of a fluctuation of a liquid sending pressure detected by the pressure sensor, wherein
   the liquid sending failure detector is configured to detect a liquid sending failure in the liquid sending pump when a fluctuation of liquid sending pressure has occurred at a specific frequency in an analysis result obtained by the frequency analysis.

7. The liquid sending system for a liquid chromatograph according to claim 6, wherein
the liquid sending failure detector is configured to specify the liquid sending pump in which a liquid sending failure has occurred by specifying a fluctuation frequency of the liquid sending pressure in an analysis result obtained by the frequency analysis, obtaining a driving frequency of each of the plurality of liquid sending pumps and comparing the specified fluctuation frequency with the driving frequency of each of the plurality of liquid sending pumps.

\* \* \* \* \*